United States Patent
Takahashi et al.

(10) Patent No.: US 7,619,661 B2
(45) Date of Patent: Nov. 17, 2009

(54) CAMERA SYSTEM

(75) Inventors: Keiichiro Takahashi, Asaka (JP); Hiroshi Tanaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 456 days.

(21) Appl. No.: 11/430,985

(22) Filed: May 10, 2006

(65) Prior Publication Data
US 2006/0262199 A1   Nov. 23, 2006

(30) Foreign Application Priority Data
May 10, 2005   (JP) .............................. 2005-137450

(51) Int. Cl.
*H04N 9/73* (2006.01)
*H04N 5/235* (2006.01)
*H04N 5/76* (2006.01)
*H04N 5/225* (2006.01)

(52) U.S. Cl. .............. 348/224.1; 348/222.1; 348/231.2; 348/360

(58) Field of Classification Search .............. 348/231.2, 348/335, 360
See application file for complete search history.

(56) References Cited
U.S. PATENT DOCUMENTS
6,992,707 B2 * 1/2006 Obrador ................... 348/220.1
2001/0028396 A1 * 10/2001 Sato ........................... 348/220
2006/0119712 A1 * 6/2006 Yamamoto et al. ........ 348/229.1
2008/0174676 A1 * 7/2008 Squilla et al. ............ 348/231.6

FOREIGN PATENT DOCUMENTS
| JP | 2000-050130 A | | 2/2000 |
| JP | 2000050130 A | * | 2/2000 |
| JP | 2000-106640 A | | 4/2000 |

* cited by examiner

*Primary Examiner*—Nhan T Tran
*Assistant Examiner*—Amy Hsu
(74) *Attorney, Agent, or Firm*—Sughrue Mion PLLC

(57) ABSTRACT

A camera system has an optical unit including: an optical system forming subject light into an image; a shooting section receiving the subject light formed into the image through the optical system, taking the image in a shooting mode selected from plural types of shooting modes, and generating an analog image signal indicating the subject light; and a data converter section converting the image signal into digital data having a data format corresponding to the shooting mode. The system also has a camera body including: a connect section where the optical unit is detachably attached; an image processing section obtaining the image data from the optical unit and processing the image data depending on the data format of the image data; and a mode selector section instructing the shooting section to select among the shooting modes and allowing the shooting section to perform shooting in the selected shooting mode.

11 Claims, 6 Drawing Sheets

| SHOOTING MODE | DATA FORMAT | SHOOTING CONDITIONS |
|---|---|---|
| VGA MOVING PICTURE SHOOTING | MPEG | SHOOTING TIME:13 MIN |
| HD MOVING PICTURE SHOOTING | RAW | NO LIMITATION |
| CONTINUOUS STILL PICTURE SHOOTING | RAW | NO LIMITATION |
| STILL PICTURE SHOOTING | YC | NO LIMITATION |

Fig. 4

|  | CAMERA HEAD 1_a | CAMERA HEAD 2_a |
|---|---|---|
| VGA MOVING PICTURE SHOOTING | YC(20MIN) MPEG(13MIN) | YC(20MIN) |
| HD MOVING PICTURE SHOOTING | YC(10MIN) MPEG(7MIN) | YC(10MIN) |
| CONTINUOUS STILL PICTURE SHOOTING | YC(100SHOTS) JPEG(85SHOTS) | YC(100SHOTS) JPEG(85SHOTS) |

Fig. 5

CAMERA SYSTEM

BACKGROUND OF THE INVENTION

1. Field of the Invention

The present invention relates to a camera system including an optical unit equipped with an image-taking optical system which forms subject light into an image, and a camera body to which the optical unit is detachably attached.

2. Description of the Related Art

There has been heretofore known a digital camera with interchangeable lenses, a camera system of which is configured of an interchangeable lens unit with a built-in taking lens, and a camera body with a built-in image pickup device, having the lens unit attached thereto. The digital camera with interchangeable lenses has an advantage of permitting users to select a lens unit suitable for use from among the lens units according to what purpose the users do shooting for.

Recently, the digital camera with interchangeable lenses has undergone evolutionary development into a digital camera with interchangeable heads, in which a lens unit with an image pickup device, which has a taking lens and an image pickup device built-in, is attached to a camera body (the lens unit with image pickup device will be hereinafter referred to simply as a "camera head"). In the digital camera with interchangeable heads, an image signal is formed by shooting in the camera head, and then, is transferred to the camera body. Furthermore, among these digital cameras with interchangeable heads, there is another type of a digital camera with interchangeable heads, which is contrived to prevent a slowdown in processing speed due to centralized control. In this type of camera, functions required for control of the digital camera are assigned to a camera head and a camera body, which are provided with respective control units to perform the respective assigned functions (see, e.g., Japanese Patent Application Laid-open No. 2000-50130). For example, the function assignment can be made so that the camera head forms RAW image data by analog to digital conversion of an image signal, and that the camera body converts the image data in a recording format by JPEG (Joint Photographic Experts Group) compression or the like.

However, the digital camera with interchangeable heads, as mentioned above, is often designed to permit users to select among various shooting modes, such as moving picture shooting mode and continuous shooting mode, in addition to normal still picture shooting mode. The camera system capable of selecting the shooting mode may require too long a time to transfer image data, if in a form of RAW data, from the camera head to the camera body, thus causing a delay in the transfer. Moreover, the camera head may be unable to withstand heat produced incident to power consumption required for the camera head to convert a data format of the image data into a recording format. It is therefore desired to make the assignment of appropriate functions to the camera head and the camera body.

SUMMARY OF THE INVENTION

The present invention has been made in view of the above circumstances and provides a camera system which is designed to make assignment of appropriate processing to a camera head and a camera body in order to process image data captured through shooting.

The present invention provides a camera system including an optical unit, and a camera body to which the optical unit is detachably attached. The optical unit includes an optical system which forms subject light into an image; a shooting section which receives the subject light formed into the image through the optical system, takes the image in a shooting mode selected from among plural types of shooting modes, and generates an analog image signal indicating the subject light; and a data converter section which converts the image signal into digital image data having a data format corresponding to the shooting mode. The camera body includes a connect section to which the optical unit is detachably attached; an image processing section which obtains the image data from the optical unit and performs image processing of the image data depending on the data format of the image data; and a mode selector section which instructs the shooting section to make selection among the shooting modes and allows the shooting section to perform shooting in the selected shooting mode.

The "plural types of the shooting modes" mentioned above can include, for example, shooting modes classified according to a way of processing image data, such as a shooting mode for recording and a shooting mode for reference; shooting modes classified according to a type of images represented by image data, such as "still picture shooting mode" and "moving picture shooting mode"; shooting modes classified according to a quality of images represented by image data, such as "high-quality mode" and "low-quality (or standard-quality) mode"; and combinations of these.

In the camera system according to the present invention, when converting an image signal captured through shooting into digital image data, the optical unit converts the image signal into image data in a data format corresponding to a shooting mode used in shooting. Thus, the camera system is able to transfer the image data from the optical unit to the camera body in an optimum data format depending on the shooting mode.

In the camera system according to the present invention, preferably, the data converter section includes processing sections, and uses at least one processing section among the processing sections, depending on the data format of the image data, to convert the image signal into the image data. In addition, it is also preferable that the optical unit includes a power supply section which supplies power to each of the processing sections or stops supplying power to unnecessary processing sections among the processing sections according to the data format of the image data.

With this configuration, the camera system can avoid unnecessary consumption of power for data format conversion, thus preventing a waste of power.

In the camera system according to the present invention, preferably, the data converter section includes plural processing sections, and uses at least one of the processing sections, which corresponds to the data format of the image data, to convert the image signal into the image data, and the optical unit includes a clock supply section which supplies a clock signal to each of the processing sections and stops supplying the clock signal to unnecessary processing sections of the processing sections according to the data format of the image data.

With this configuration, the camera system can reduce unnecessary consumption of power for the data format conversion.

In the camera system according to the present invention, preferably, the image processing section is capable of performing the image processing on each image data having each of at least one of data formats, and at least one of the optical unit and the camera body includes a format limitation section which finds a common data format by comparing between data formats convertible by the data converter section and data formats processable by the image processing section, and which limits the data formats used by the data converter section to the common data format.

With this configuration, the camera system can select an appropriate data format according to the shooting mode from among data formats having compatibility between the optical unit and the camera body, for the optical unit to perform the data format conversion.

Preferably, the camera system according to the present invention also includes a shooting limitation section which limits shooting in terms of quantity according to a combination of the shooting mode and the data format, when the combination exceeds throughput of the optical unit.

With this configuration, the camera system can avoid the optical unit from undergoing a load of power beyond capacity of the optical unit and also from malfunctioning, even when the optical unit has a low level of limits of power consumption.

In the camera system according to the present invention, preferably, the data formats include a YC data format, the shooting modes include a still picture shooting mode, and the data converter section converts the analog image signal into image data in the YC data format, when the shooting mode is the still picture shooting mode.

The still picture shooting mode causes relatively little load of power required for the optical unit to perform shooting. It is therefore desirable that the camera system achieve a data format of image data to be received by the camera body, with which data format subsequent processing is easily performed, rather than that the load of power on the optical unit be reduced. In this respect, in the still picture shooting mode, the camera system having this configuration operates so that the optical unit converts image data into highly compatible, easy-to-process YC data and then transfers the YC data to the camera body. Accordingly, the camera system performs the processing suitable for the still picture shooting mode.

In the camera system according to the present invention, preferably, the data formats include a RAW data format, the shooting modes include a continuous still picture shooting mode, and the data converter section converts the analog image signal into image data in the RAW data format, when the shooting mode is the continuous still picture shooting mode.

The continuous still picture shooting mode causes a heavy load of power required for the shooting section to perform shooting and therefore, when the data format conversion is additionally assigned to the optical unit, the load may exceed the capacity of the optical unit. In this regard, in the continuous still picture shooting mode, the camera system having this configuration operates so that the optical unit transfers image data in the form of simply digitized RAW data to the camera body and the camera body performs subsequent necessary processing on the data. Accordingly, the camera system can reduce the load on the optical unit.

The camera system according to the present invention can assign appropriate processing to each of the camera head and the camera body in order to process image data obtained through shooting.

BRIEF DESCRIPTION OF THE DRAWINGS

FIG. 4 is a table showing shooting conditions, which are imposed on the camera head when the camera head shown in FIG. 1 is attached to the camera body and automatic setting mode is selected;

FIG. 5 is a diagram showing a limitation table of the camera head shown in FIG. 1.

DETAILED DESCRIPTION OF THE INVENTION

An embodiment of the present invention will be described below.

Figure 1:
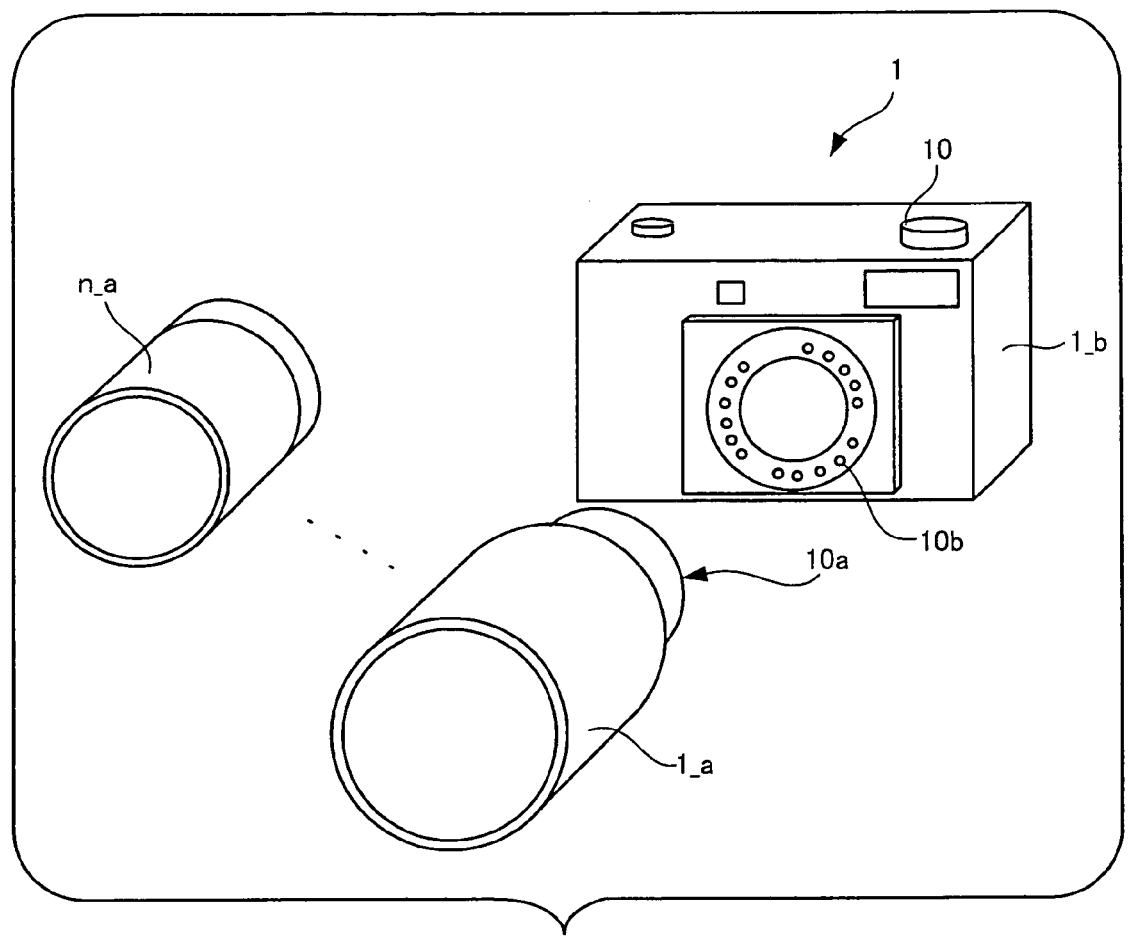
FIG. 1 is an exploded view of a camera system to which an embodiment of the present invention is applied.

FIG. 1 is an exploded view of a camera system to which an embodiment of the present invention is applied.

Plural types of camera heads $1\_a, 2\_a, \ldots,$ and $n\_a$, each of which has a taking lens and a CCD (charge coupled device) built-in, are provided for a camera system 1 shown in FIG. 1. Any one of the plural types of camera heads is selected for use. Each of the camera heads $1\_a, 2\_a, \ldots,$ and $n\_a$ corresponds to one example of an optical unit according to the present invention. Firstly, a description will be given below taking an instance where the camera head $1\_a$ is selected from among the plural types of camera heads $1\_a, 2\_a, \ldots,$ and $n\_a$.

The camera system 1 is configured of the camera head $1\_a$, and a camera body $1\_b$ to which the camera head $1\_a$ is detachably attached. The camera head $1\_a$ and the camera body $1\_b$ communicate each other through electrical contacts provided between a mount connector $10a$ and a mount $10b$. The camera body $1\_b$ is an example of a camera body according to the present invention.

The mount $10b$ is provided on the front side of the camera body $1\_b$, and the mount connector $10a$ of the camera head is detachably fitted into the mount $10b$. The mount $10b$ is an example of a connect section according to the present invention.

In addition, a mode dial 10 for setting shooting modes or the like is provided on the top of the camera body $1\_b$. By turning the mode dial 10, users can select one mode among five ones: a still picture shooting mode, a continuous still picture shooting mode, a high-quality moving picture shooting mode (hereinafter called "HD (high-definition) moving picture shooting mode"), a standard-quality moving picture shooting mode (hereinafter called "VGA (Video Graphics Array) moving picture shooting mode"), and a setting mode. In shooting, the users can select the shooting mode among these five modes, that is, the still picture shooting mode, the continuous still picture shooting mode, the HD moving picture shooting mode, and the VGA moving picture shooting mode. By selecting the setting mode, the users can make settings for various shooting conditions or image data processing. In the setting mode, in particular, the camera system 1 allows selection between an automatic setting mode and a manual setting mode, when presetting a data format of image data to be transferred from the camera head $1\_a$ to the camera body $1\_b$ after being obtained through shooting. As employed herein, the automatic setting mode refers to a mode in which the camera head $1\_a$ and the camera body $1\_b$ cooperate to automatically set the data format, and the manual setting mode refers to a mode in which the users manually set their desired data formats.

Figure 2:
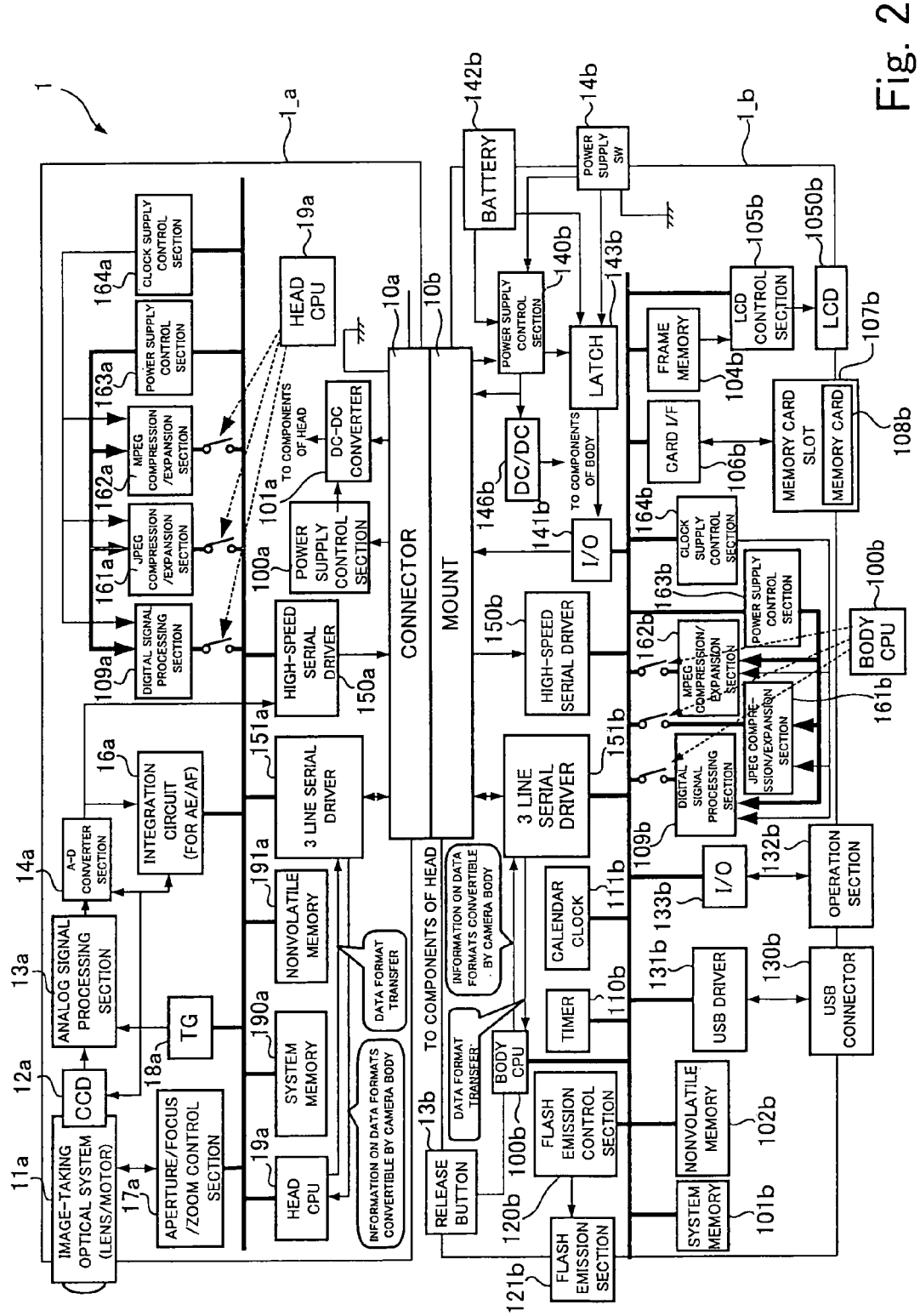
FIG. 2 is a block diagram showing the internal configuration of the camera system shown in FIG. 1.

FIG. 2 is a block diagram showing an internal configuration of the camera system shown in FIG. 1.

First, the description will be given with regard to the camera head 1_a.

The camera head 1_a is provided with an image-taking optical system 11a equipped with various lenses, such as a focus lens and a zoom lens, and motors or other drives for driving the various lenses; an aperture/focus/zoom control section 17a which controls a lens position of the focus or zoom lens, an aperture or the like by controlling the motors within the image-taking optical system 11a; a CCD 12a which receives a subject light being formed into an image through the image-taking optical system 11a and generates a subject signal representing the subject light; an analog signal processing section 13a which performs amplification, gain control, or other processing of the subject signal; an A-D converter section 14a which converts the subject signal in an analog signal format into image data in digital format; and a TG (timing generator) 18a which sends out timing signals to the CCD 12a, the analog signal processing section 13a, and the A-D converter section 14a. To avoid confusion among plural types of the image data which will appear hereinbelow, the data format of the image data, just after conversion by the A-D converter section 14a, will be called "RAW data". The camera head 1_a further includes processing sections which perform processing for data format conversion on the image data in the form of RAW data obtained through shooting. Specifically, the camera head 1_a includes a digital signal processing section 109a which converts the image data from RAW data to YC data (luminance and chrominance components); a JPEG compression/expansion section 161a which performs JPEG compression on YC data; and an MPEG (Moving Picture Experts Group) compression/expansion section 162a which performs MPEG compression on YC data. The camera head 1_a is also provided with a power supply control section 163a and a clock supply control section 164a, each of which controls a supply of power and clock, respectively, to these processing sections; and a head CPU (central processing unit) 19a which controls various components of the camera head 1_a.

In addition, the camera head 1_a further includes a 3 line serial driver 151a and a high-speed serial driver 150a, which are provided also for the camera body 1_b. The high-speed serial driver 150a serves to transmit the image data or the like obtained through shooting from the camera head 1_a to the camera body 1_b. The 3 line serial driver 151a serves to transmit and receive information between the camera head 1_a and the camera body 1_b. The information includes information on the processing for data format conversion executable by the camera body 1_b, and information on the data format of the image data to be transferred from the camera head 1_a to the camera body 1_b. For example, when the camera body 1_b is operated through the mode dial 10 shown in FIG. 1 to thereby set the shooting mode, the camera head 1_a receives information on the set shooting mode. Upon receipt of the information, under control of the head CPU 19a, the digital signal processing section 109a, the JPEG compression/expansion section 161a, the MPEG compression/expansion section 162a, the power supply control section 163a and the clock supply control section 164a are controlled and thereby perform the processing for data format conversion on the image data obtained through shooting. This operation will be described later. Although two head CPUs 19a are shown in FIG. 2 as disposed on the right and left sides, respectively, of the camera head 1_a, the separate CPUs are shown merely for the purpose of clearly showing operations of the head CPU 19a. One and the same CPU, rather than the two different ones, is actually provided.

The camera head 1_a includes, besides the various components mentioned above, a nonvolatile memory 191a in which parameters such as the pixel count of the CCD 12a and the f-numbers of the lenses are recorded; an integration circuit 16a which performs subject luminance detection (or AE (autoexposure) detection) or subject contrast detection (or AF (autofocus) detection), based on low-resolution image data; a system memory 190a in which programs providing processing procedures and the like for the AE and AF detections are stored; a power supply control section 100a which controls the supply of power to the camera head 1_a and the various components of the camera head 1_a; and a DC-DC converter 101a which adjusts power.

Next, the description will be given with regard to the camera body 1_b.

The camera body 1_b operates under centralized control of a body CPU 100b. The camera body 1_b includes a system memory 101b having programs stored therein; a 3 line serial driver 151b which serves to send and receive information with the camera head 1_a; a high-speed serial driver 150b which serves to receive the image data transmitted from the camera head 1_a; a nonvolatile memory 102b which records various parameters or other data received by the 3 line serial driver 151b; a timer 110b for timer shooting; a calendar clock section 111b which adjusts a calendar clock; a USB (Universal Serial Bus) driver 131b which can be connected to a personal computer or other equipment through a USB connector 130b; a flash emission section 121b which emits flash through a flash emission window provided in the camera body 1_b; a flash emission control section 120b which controls the amount of flash emission from the flash emission section 121b; a power supply SW (switch) 14b which serves to power the camera system 1 on; a battery 142b which supplies power to the camera system 1; a power supply control section 140b which controls power supply from the battery 142b to components of the camera body 1_b; a DC-DC converter 146b which adjusts power; a latch 143b which holds and feeds power to the camera head 1_a through an I/O (input/output) 141b; a frame memory 104b which temporarily records through image data received by the high-speed serial driver 150b; an LCD (liquid crystal display) control section 105b which controls display on an LCD 1050b; the LCD 1050b which displays various menu screens, through images, or the like; a memory card slot 107b into which a memory card 108b is inserted; and the memory card 108b on which image data generated during shooting is recorded via a card I/F (interface) 106b.

In addition, the camera body 1_b also includes various operational buttons and dials, such as the mode dial 10 shown in FIG. 1. Referring to FIG. 2, these buttons and dials are collectively expressed as an operation section 132b. When users determine various settings by operating the camera body 1_b through the operation section 132b, the settings are transmitted to the body CPU 100b of the camera body 1_b through an I/O 133b.

The camera body 1_b further includes processing sections which perform the processing for data format conversion on the image data received by the high-speed serial driver 150b. Specifically, the camera body 1_b includes a digital signal processing section 109b which converts the image data from RAW data to YC data; a JPEG compression/expansion section 161b which performs JPEG compression on YC data; and an MPEG compression/expansion section 162b which performs MPEG compression on YC data. The camera body 1_b is also provided with a power supply control section 163b and a clock supply control section 164*b*, each of which controls the supply of power and clock, respectively, to these processing sections. Each of these sections is controlled by the body CPU 100*b*. Although two body CPUs 100*b* are shown in FIG. 2 as disposed at the upper left and center, respectively, of the camera body 1_*b*, the separate CPUs are shown merely for the purpose of clearly showing operations of the body CPU 100*b*. One and the same CPU, rather than the two different ones, is actually provided.

The camera system 1 shown in FIG. 2 is configured of the camera head 1_*a* and the camera body 1_*b*, which are connected by fitting of the mount connector 10*a* into the mount 10*b* in a detachable way, as described with reference to FIG. 1. The camera head 1_*a* and the camera body 1_*b* communicate each other through the electrical contacts provided between the mount connector 10*a* and the mount 10*b*.

The above description provides the configuration of the camera system 1 according to the embodiment of the present invention.

Next, a description will be given with regard to how the camera system 1 handles the data format of image data (hereinafter called "captured image data") captured by shooting in the shooting mode set by turning the shooting mode dial 10, when the image data are transferred from any one of the camera heads 1_*a*, 2_*a*, . . . , and n_a to the camera body 1_*b*.

As previously mentioned, the camera system 1 can be operated through the mode dial 10 shown in FIG. 1 to thereby select among the four shooting modes; the still picture shooting mode, the VGA moving picture shooting mode, the continuous still picture shooting mode, and the HD moving picture shooting mode. Then, it is able to select the data format (hereinafter called a "transfer format") between the automatic setting mode and the manual setting mode, when the image data captured by the shooting (hereinafter called "captured image data") are transferred from the camera head 1_*a* to the camera body 1_*b*. As employed herein, the automatic setting mode refers to a mode in which the camera system 1 automatically sets the data format according to the shooting mode, and the manual setting mode refers to a mode in which users manually set their desired data formats.

A description will be given below with regard to both processes of determining the data format in the automatic and manual setting modes, taking an instance where the camera head 1_*a* is selected for use.

Figure 3:
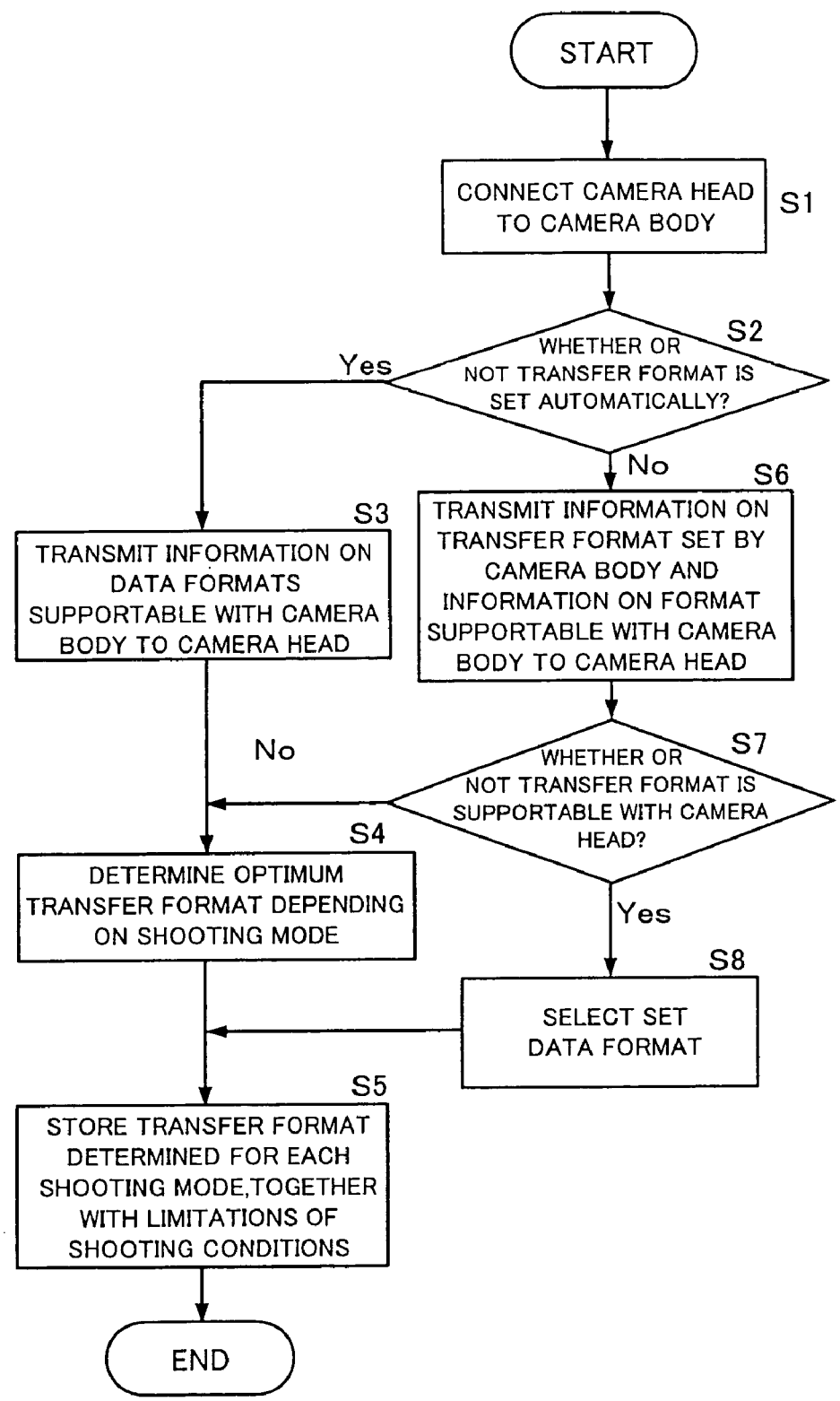
FIG. 3 is a flowchart showing a series of steps in the process of determining a data format of captured image data to be transferred from a camera head to a camera body, when the camera head and the camera body which are shown in FIG. 2 are connected.

FIG. 3 is a flowchart showing a series of steps in the process of determining the data format in transferring captured image data from the camera head 1_*a* to the camera body 1_*b*, when the camera head 1_*a* and the camera body 1_*b* shown in FIG. 2 are connected.

When the camera head 1_*a* is first connected to the camera body 1_*b* (step S1), determination is then made as to whether the automatic setting mode is selected to set the data format of captured image data to be transferred (step S2). When the automatic setting mode is selected (Yes in step S2), the body CPU 100*b* shown in FIG. 2 transmits information indicating data formats supportable by the camera body 1_*b* to the head CPU 19*a* through the mount 10*b* and the mount connector 10*a*. Specifically, the camera body 1_*b* shown as an example in FIG. 2 includes the digital signal processing section 109*b*, the JPEG compression/expansion section 161*b*, and the MPEG compression/expansion section 162*b*. Thus, the body CPU 100*b* transmits to the head CPU 19*a* the information indicating that the camera body 1_*b* can perform conversion into YC signal, JPEG compression/expansion, or MPEG compression/expansion (step S3). Then, the head CPU 19*a* determines an optimum transfer format depending on the shooting mode, from the viewpoint of power consumption for data transfer or compatibility for data processing, taking into account the contents of the incoming information, that is, the data formats convertible by the camera body 1_*b*, and the data formats convertible by the camera head 1_*a* (step S4). This determination allows determining what the camera head 1_*a* performs for the format conversion of image data obtained through shooting. For example, the camera head 1_*a* shown in FIG. 2 includes the digital signal processing section 109*a*, the JPEG compression/expansion section 161*a*, and the MPEG compression/expansion section 162*a*. Thus, the camera head 1_*a* can perform the conversion into YC signal, the JPEG compression/expansion, or the MPEG compression/expansion, as in the case of the camera body 1_*b*. Herein, a description will be given, provided that optimum combinations of the transfer format and the shooting mode are determined in a following manner: a RAW data format is selected as the transfer format for the continuous still picture shooting mode or the HD moving picture shooting mode; a YC data format is selected as the transfer format for the still picture shooting mode; or an MPEG-compressed data format is selected as the transfer format for the VGA moving picture shooting mode. There is a sufficient reason to mention that these combinations are optimal, as given below.

Generally, the continuous still picture shooting mode causes a heavy load of power required for a camera head to perform shooting. When data format conversion is additionally assigned to the camera head, the load may exceed the capacity of the camera head. In the continuous still picture shooting mode and the HD moving picture shooting mode, the camera system of the embodiment operates so that the camera head transfers image data in the form of simply digitized RAW data to the camera body and the camera body performs subsequent necessary processing on the data. In this manner, the camera system of the embodiment reduces the load on the camera head. The still picture shooting mode causes relatively little load of power be required for the camera head to perform shooting. It is therefore desirable that the camera system achieve a data format of image data to be received by the camera body, with which data format the subsequent processing is easily performed, rather than that the load of power on the camera head be reduced. In the still picture shooting mode, the camera system of the embodiment thus operates so that the camera head converts image data into highly compatible, easy-to-process YC data and then transfers the YC data to the camera body. In this manner, the camera system of the embodiment enables the processing suitable for the still picture shooting mode. In the VGA moving picture shooting mode which requires less power than that for the HD moving picture shooting mode, the MPEG-compressed data format is desirable in terms of a transfer rate.

When the optimum combination of the transfer format and the shooting mode is determined in the above-described manner, the limitations of shooting conditions concerning the number of shots or a shooting time corresponding to the limits of power consumption by the camera head 1_*a* are imposed on the thus determined combination of the transfer format and the shooting mode. The limitations of the shooting conditions, in conjunction with the combination of the transfer format and the shooting mode, are stored in the nonvolatile memory 191*a* shown in FIG. 2 (step S5).

FIG. 4 is a table showing the shooting conditions, which are imposed on the camera head 1_*a* when the camera head 1_*a* shown in FIG. 1 is attached to the camera body 1_*b* and the automatic setting mode is selected.

As mentioned above, the RAW data format is selected for the continuous still picture shooting mode or the HD moving picture shooting mode, and the MPEG-compressed data format is selected for the VGA moving picture shooting mode. In the case of this selection of the data format, the shooting time is limited to thirteen minutes only in the case of MPEG compression in the VGA moving picture shooting mode, as shown in FIG. 4.

Such limitations depend on throughput of each of the camera heads shown in FIG. 1 and are based on a limitation table prestored in each camera head prior to the connection to the camera body 1_b. The limitation table contains limitations for each of the combinations of the shooting modes and the transfer formats. When the combination of the shooting mode and the transfer format is determined, the limitations are called from the limitation table according to the determined combination.

FIG. 5 is a table showing an example of the limitation table of the camera head.

As shown in the "camera head 1_a" column of FIG. 5, when image data are transferred in the YC, MPEG-compressed and JPEG-compressed data formats in the VGA moving picture shooting, HD moving picture shooting and continuous still picture shooting modes, the limitations (e.g., the limitations shown in FIG. 4) concerning the shooting time or the number of shots, which are shown in the column, are respectively imposed on the data formats. There is no limitation on combinations not contained in the limitation table shown in FIG. 5. There is no limitation on the shooting time or the number of shots, for example when RAW data are transferred in any shooting mode.

The above descriptions provide the process of determining the transfer format depending on the shooting mode, when, in step S2, the automatic setting mode is selected to set the transfer format.

As described above, the selection of the optimum transfer format according to the shooting mode prevents the camera head 1_a from undergoing a load of power beyond the capacity of the camera head 1_a, while the capabilities of processing captured image data are kept in an optimum state.

Descriptions will be given later with regard to an instance where, in step S2, the manual setting mode is selected to set the transfer format. Descriptions will now be given with regard to how the camera system 1 operates when shooting is performed in each of the shooting modes, using the transfer format determined through the above process.

Figure 6:
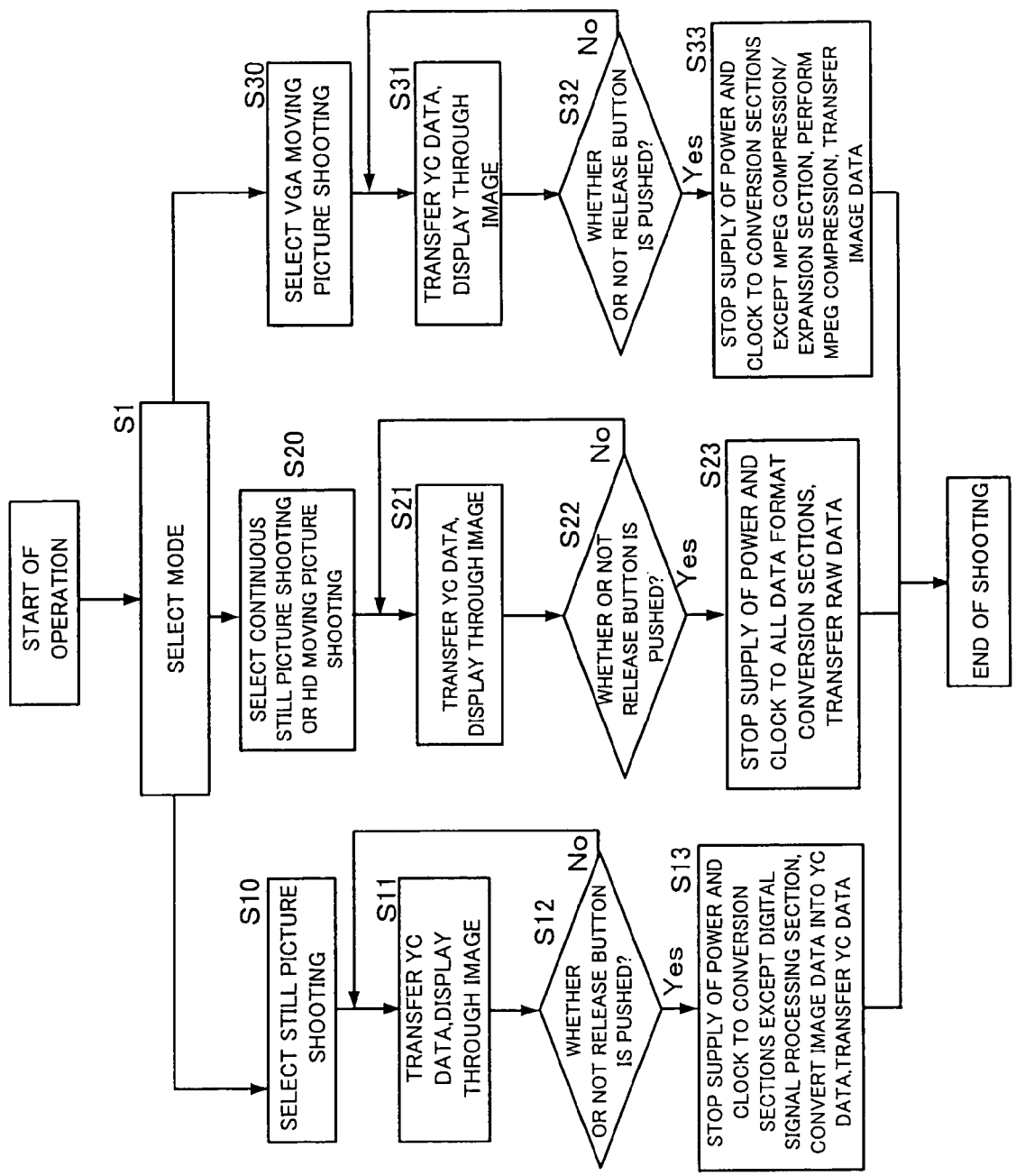
FIG. 6 is a flowchart showing how the camera system operates when shooting is performed using a transfer format determined in an instance where the automatic setting mode is selected.

FIG. 6 is a flowchart showing how the camera system operates when shooting is performed using the transfer format determined in an instance where the automatic setting mode is selected.

First, a user selects among the shooting modes for shooting by operating the camera system through the operation section 132b shown in FIG. 2 (step S1).

When the still picture shooting mode is selected (step S10), the operation goes to step S11. Until shooting starts with the press of a release button 13b shown in FIG. 2, image data which indicates a through image, and which are converted into a YC signal by the digital signal processing section 109a of the camera head 1_a, are transferred to the camera body 1_b, and the through image is displayed on the LCD 1050b (step S11).

Desirably, RAW data are used as the transfer format of the image data which indicates the through image, and which are to be transferred from the camera head 1_a to the camera body 1_b, in order to reduce the load of power on the camera head 1_a. However, when the image data indicating the through images are transferred one after another, the transfer of such a succession of image data in the form of RAW data may take a too long time and lag behind subsequent processing. For this reason, the camera system of the embodiment is configured so that an increase in the transfer rate has priority over a reduction in power consumption. Specifically, the image data indicating the through image, after being converted into the YC signal by the camera head 1_a, is transferred to the camera body 1_b, so that the camera system achieves an increase in the transfer rate of image data. A state where through image data indicating a subject are generated, as mentioned above, is a form of shooting mode according to the present invention, and is the shooting mode for reference, as distinct from the shooting mode for recording, such as the still picture shooting mode.

When shooting starts with the press of the release button 13b (Yes in step S12), the head CPU 19a grasps information on the transfer format for the still picture shooting mode (in other words, the YC signal data format), which information is stored in the nonvolatile memory 191a. The head CPU 19a instructs the power supply control section 163a and the clock supply control section 164a to stop the supply of power and clock, respectively, to the JPEG compression/expansion section 161a and the MPEG compression/expansion section 162a which are not required for conversion into YC signal. This function enables power savings during shooting. Then, captured image data obtained through the shooting are converted into a YC signal by the digital signal processing section 109a, and the image data in YC signal form is transferred to the camera body 1_b (step S13). The camera body 1_b performs the subsequent processing for data format conversion on the image data, if necessary. When performing this data format conversion, the body CPU 100b instructs the power supply control section 163b and the clock supply control section 164b to stop the supply of power and clock, respectively, to the unnecessary sections for the data format conversion, whereby power savings are achieved as in the case of the camera head 1_a.

When step S1 of FIG. 6 results in the selection of the continuous still picture shooting mode or the HD moving picture shooting mode (step S20), the operation goes to step S21. Until shooting starts with the press of the release button 13b shown in FIG. 2, image data which indicate a through image, and which are converted into a YC signal by the digital signal processing section 109a of the camera head 1_a, are transferred to the camera body 1_b, and the through image is displayed on the LCD 1050b (step S21). When the shooting starts with the press of the release button 13b (Yes in step S22), the head CPU 19a grasps information on the transfer format for the continuous still picture shooting mode or the HD moving picture shooting mode (in other words, the RAW data format), which information is stored in the nonvolatile memory 191a. The head CPU 19a instructs the power supply control section 163a and the clock supply control section 164a to stop the supply of power and clock, respectively, to the digital signal processing section 109a, the JPEG compression/expansion section 161a and the MPEG compression/expansion section 162a. Thereafter, captured image data obtained through the shooting are transferred in the RAW data format to the camera body 1_b (step S23). The camera body 1_b performs the subsequent processing for data format conversion on the image data, if necessary, after stopping the supply of power and clock to the unnecessary sections for the data format conversion.

When step S1 of FIG. 6 results in the selection of the VGA moving picture shooting mode (step S30), the operation goes to step S31. Until shooting starts with the press of the release button 13b shown in FIG. 2, image data which indicates a through image, and which are converted into a YC signal by the digital signal processing section 109a of the camera head

1_*a*, are transferred to the camera body 1_*b*, and the through image is displayed on the LCD 1050*b* (step S31). When the shooting starts with the press of the release button 13*b* (Yes in step S32), the head CPU 19*a* grasps information on the transfer format for the VGA moving picture shooting mode (in other words, the MPEG-compressed data format), which information is stored in the nonvolatile memory 191*a*. The head CPU 19*a* instructs the power supply control section 163*a* and the clock supply control section 164*a* to stop the supply of power and clock, respectively, to the digital signal processing section 109*a* and the JPEG compression/expansion section 161*a*. Then, captured image data obtained through the shooting are compressed by the MPEG compression/expansion section 162*a*, and the image data are transferred to the camera body 1_*b* (step S33). The camera body 1_*b* subjects the image data to the subsequent processing for data format conversion, if necessary, after stopping the supply of power and clock to the unnecessary sections for the data format conversion.

The above descriptions provide how the camera system 1 operates when shooting is performed in each of the shooting modes, using the transfer format which is determined when the automatic setting mode is selected to set the transfer format in step S2 of FIG. 3.

Returning now to the flowchart of FIG. 3, descriptions will be given with regard to the instance where, in step S2, the manual setting mode is selected to set the transfer format.

When the manual setting mode is selected to set the transfer format in step S2 (No in step S2), the transfer format is set for each of the shooting modes by the user operating the camera body through the operation section 132*b* shown in FIG. 2. Information on the set transfer format, in conjunction with information on the data format supportable by the camera body 1_*b*, is transmitted from the camera body 1_*b* to the head CPU 19*a* in the camera head 1_*a* (step S6). The head CPU 19*a* determines whether the camera head 1_*a* can perform data format conversion into the set transfer format, taking into account the data formats convertible by the camera head 1_*a* and the camera body 1_*b* (step S7). The camera head 1_*a* shown for example in FIG. 2 can perform data format conversion into any one of the RAW, YC, MPEG-compressed and JPEG-compressed data formats to form the transfer format. When any one of these data formats is set, the determination is made that the set data format is selected as the transfer format (step S8).

When a camera head capable of conversion into many types of data formats, such as the camera head 1_*a* shown in FIG. 2, is attached for use, the determination is made that the set data format is selected as the transfer format, as mentioned above. When a camera head capable of conversion into fewer types of data formats is attached for use, the camera head, however, may be unable to perform data format conversion into the set transfer format (No in step S7). In this case, the head CPU 19*a* determines an optimum transfer format selected from among the convertible data formats, from the viewpoint of power consumption for data transfer and compatibility for data processing, as in the case of the automatic setting mode described above (step S4).

As in the case of the automatic setting mode mentioned above, the limitations of shooting conditions as shown in FIG. 4 are then imposed on the transfer format determined for each of the shooting modes through step S8 or S4, by the limitation table shown in FIG. 5. The limitations of the shooting conditions, in conjunction with the combination of the transfer format and the shooting mode, are stored in the nonvolatile memory 191*a* shown in FIG. 2 (step S5).

The above descriptions provide the operation of the camera system, when the camera head 1_*a* is attached to the camera body 1_*b*.

Next, descriptions will be given with regard to the operation of the camera system, when the camera head 2_*a*, which is different from the camera head 1_*a* shown in FIG. 2, is attached to the camera body 1_*b*.

The configuration of the camera head 2_*a* is different from that of the camera head 1_*a* shown in FIG. 2, in that the camera head 2_*a* does not have the MPEG compression/expansion section 162*a*, and in that the camera body 1_*b* cannot process RAW data obtained by the camera head 2_*a* because the type of RAW data obtained by the camera head 2_*a* is different from that of RAW data supportable by the camera body 1_*b*. The configuration of the camera head 2_*a* is the same as that of the camera head 1_*a* shown in FIG. 2, except for these points of difference. Thus, descriptions of the same parts will be omitted.

The process of determining the transfer format according to the shooting mode is also the same as the process shown in the flowchart of FIG. 3. However, the camera head 2_*a* is different in the following points. The camera head 2_*a* does not have the MPEG compression/expansion section 162*a*, and moreover the camera body 1_*b* cannot process RAW data obtained by the camera head 2_*a*. For this reason, the camera head 2_*a* can adopt only limited types of data formats as the transfer format, as compared to the camera head 1_*a*. Thus, the camera head 2_*a* can make only a choice between the YC and JPEG-compressed data formats for each of the shooting modes. Thus, for example when the automatic setting mode is selected to set the transfer format in step S2 of the flowchart shown in FIG. 3, the camera head 2_*a* selects the YC data format for all of the shooting modes: the still picture shooting mode, the VGA moving picture shooting mode, the HD moving picture shooting mode, and the continuous still picture shooting mode, from the viewpoint of the power consumption for the data transfer depending on the shooting mode or the compatibility or transfer rate for the data processing. Likewise, also when the manual setting mode is selected to set the transfer format, the camera head 2_*a* selects the YC data format as the transfer format unless the user sets the JPEG-compressed data format. When limitations are imposed on the shooting time or the number of shots taken for the transfer, the RAW or MPEG-compressed data format cannot be selected, and the same limitations as those in the "camera head 1_*a*" column are imposed on the YC and JPEG-compressed data formats, as shown in the "camera head 2_*a*" column of FIG. 5.

The above descriptions provide the embodiment of the present invention.

In the above descriptions, the body CPU 100*b* is an example of a mode selector section according to the present invention, and the head CPU 19*a* is an example of a format limitation section according to the present invention.

The embodiment is described above, giving the instance where the camera head 1_*a* having many types of convertible data formats or the camera head 2_*a* having few types of convertible data formats is attached to the camera body 1_*b* capable of supporting many types of data formats. However, the camera system according to the present invention may be configured in such a manner that the camera head having many types of convertible data formats or the camera head having few types of convertible data formats is attached to the camera body having few types of supportable data formats. In such a camera system, the data formats converted by the camera head are limited by the data formats supportable by the camera body.

The embodiment described above adopts an approach for determining the transfer format, in which approach when the camera head 1_a or 2_a is attached to the camera body 1_b, the body CPU 100b and the CPU of the camera head communicate with each other to determine the transfer format. However, the camera system according to the present invention may adopt an approach for determining the transfer format, in which approach when the shooting mode is set, the body CPU 100b and the CPU of the camera head communicate with each other to determine the transfer format.

What is claimed is:

1. A camera system including an optical unit, and a camera body to which the optical unit is detachably attached,
   the optical unit, comprising:
   an optical system which forms subject light into an image;
   a shooting section which receives the subject light formed into the image through the optical system, takes the image in a shooting mode selected from among a plurality of types of shooting modes, and generates an analog image signal indicating the subject light; and
   a data converter section which converts the image signal into digital image data having a data format corresponding to the shooting mode, and
   the camera body, comprising:
   a connect section to which the optical unit is detachably attached;
   an image processing section which obtains the image data from the optical unit and performs image processing of the image data according to the data format of the image data; and
   a mode selector section which instructs the shooting section to make selection among the shooting modes, and which allows the shooting section to perform shooting in the selected shooting mode,
   wherein the image processing section performs the image processing on each image data having each of at least one of data formats, and
   at least one of the optical unit and the camera body includes a format limitation section which finds a common data format by comparing between data formats convertible by the data converter section and data formats processable by the image processing section, and which limits the data formats used by the data converter section to the common data format.

2. A camera system including an optical unit, and a camera body to which the optical unit is detachably attached, wherein
   the optical unit comprises:
   an optical system which forms subject light into an image;
   a shooting section which receives the subject light formed into the image through the optical system, takes the image in a shooting mode selected from a plurality of types of shooting modes, and generates an analog image signal indicating the subject light; and
   a data converter section which converts the image signal into digital image data having a data format corresponding to the shooting mode, and
   the camera body comprises:
   a connect section to which the optical unit is detachably attached;
   an image processing section which obtains the image data from the optical unit and performs image processing of the image data according to the data format of the image data; and
   a mode selector section which instructs the shooting section to make selection among the shooting modes, and which allows the shooting section to perform shooting in the selected shooting mode, and
   wherein the data converter section includes a plurality of processing sections, and uses at least one of the plurality of processing sections, which corresponds to the data format of the image data, to convert the image signal into the image data, and
   the optical unit includes a power supply section which supplies power to each of the plurality of processing sections and, according to the data format of the image data, stops supplying the power to unnecessary processing sections of the plurality of processing sections.

3. A camera system including an optical unit, and a camera body to which the optical unit is detachably attached, wherein
   the optical unit comprises:
   an optical system which forms subject light into an image;
   a shooting section which receives the subject light formed into the image through the optical system, takes the image in a shooting mode selected from a plurality of types of shooting modes, and generates an analog image signal indicating the subject light; and
   a data converter section which converts the image signal into digital image data having a data format corresponding to the shooting mode, and
   the camera body comprises:
   a connect section to which the optical unit is detachably attached;
   an image processing section which obtains the image data from the optical unit and performs image processing of the image data according to the data format of the image data; and
   a mode selector section which instructs the shooting section to make selection among the shooting modes, and which allows the shooting section to perform shooting in the selected shooting mode, and
   wherein the data converter section includes a plurality of processing sections, and uses at least one of the plurality of processing sections, which corresponds to the data format of the image data, to convert the image signal into the image data, and
   the optical unit includes a clock supply section which supplies a clock signal to each of the plurality of processing sections and, according to the data format of the image data, stops supplying the clock signal to unnecessary processing sections of the plurality of processing sections.

4. The camera system according to claim 1, comprising a shooting limitation section which limits shooting in terms of quantity according to a combination of the shooting mode and the data format, when the combination exceeds throughput of the optical unit.

5. The camera system according to claim 1, wherein the data formats include a YC data format,
   the shooting modes include a still picture shooting mode, and
   the data converter section converts the analog image signal into the image data in the YC data format, when the shooting mode is the still picture shooting mode.

6. The camera system according to claim 1, wherein the data formats include a RAW data format,
   the shooting modes include a continuous still picture shooting mode, and
   the data converter section converts the analog image signal into image data in the RAW data format, when the shooting mode is the continuous still picture shooting mode.

7. The camera system according to claim 1, wherein the shooting modes comprise at least two of:
   a still picture shooting mode,
   a video graphics array moving picture shooting mode, a continuous still picture shooting mode, and a high definition moving picture shooting mode.

8. The camera system according to claim 1, wherein the optical unit further comprises:
   a head processor which receives information indicating data formats supportable by the camera body from the mode selector section and determines an optimum data transfer format for the selected shooting mode.

9. The camera system according to claim 8, wherein the shooting mode is selected from at least three of a still picture shooting mode, a video graphics array (VGA) moving picture shooting mode, a continuous still picture shooting mode, and a high definition (HD) moving picture shooting mode, and wherein the head processor selects one of:
   a RAW data format as the transfer format for the continuous still picture shooting mode or HD moving picture shooting mode,
   a YC data format as the transfer format for the still picture shooting mode, and
   an MPEG-compressed data format as the transfer format for the VGA moving picture shooting mode.

10. The camera system according to claim 8, wherein the optical unit further comprises:
   a limitation table, from which a limitation condition which corresponds to the determined data transfer for the selected shooting mode is retrieved and imposed on the shooting section.

11. The camera system according to claim 10, further comprising:
   a plurality of optical units to be detachably attached to the camera body and wherein the limitation table is stored in advance for each type of the optical unit to limit the shooting based on a throughput of a corresponding optical unit.

* * * * *